United States Patent
Hong

(10) Patent No.: US 12,549,960 B2
(45) Date of Patent: Feb. 10, 2026

(54) REQUEST SENDING METHOD AND DEVICE AND REQUEST RECEIVING METHOD AND DEVICE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 262 days.

(21) Appl. No.: 18/287,286

(22) PCT Filed: Apr. 23, 2021

(86) PCT No.: PCT/CN2021/089432
§ 371 (c)(1),
(2) Date: Oct. 17, 2023

(87) PCT Pub. No.: WO2022/222154
PCT Pub. Date: Oct. 27, 2022

(65) Prior Publication Data
US 2024/0205689 A1    Jun. 20, 2024

(51) Int. Cl.
*H04W 16/14*    (2009.01)

(52) U.S. Cl.
CPC .................. *H04W 16/14* (2013.01)

(58) Field of Classification Search
CPC .. H04W 16/14; H02J 7/02; H02J 50/80; H02J 50/40
See application file for complete search history.

(56) References Cited

U.S. PATENT DOCUMENTS

| 2011/0206154 | A1* | 8/2011 | Ding | H04L 5/0035 |
| | | | | 375/267 |
| 2012/0214536 | A1* | 8/2012 | Kim | H02J 7/00034 |
| | | | | 455/522 |
| 2013/0214734 | A1 | 8/2013 | Kang et al. | |
| 2021/0410048 | A1* | 12/2021 | Yu | H04W 48/14 |
| 2023/0098215 | A1* | 3/2023 | Tanaka | H04W 56/0035 |
| | | | | 370/329 |

FOREIGN PATENT DOCUMENTS

| CN | 111971873 A | 11/2020 |
| WO | WO 2020026412 A1 | 2/2020 |

OTHER PUBLICATIONS

U.S. Appl. No. 63/045,718, filed Jun. 29, 2020. (Year: 2020).*
PCT/CN2021/089432 International Search Report dated Jan. 20, 2022, 2 pages.
European Patent Application No. 21937382.6 Search Report dated Nov. 5, 2024, 14 pages.

* cited by examiner

*Primary Examiner* — Sun Jong Kim
(74) *Attorney, Agent, or Firm* — Cozen O'Connor

(57) ABSTRACT

A method for sending a request. The method includes: sending a cooperative charging request to at least one second base station to request the at least one second base station to cooperatively perform wireless charging for a terminal. A method for receiving a request is further disclosed.

17 Claims, 9 Drawing Sheets sending a cooperative charging request to at least one second base station to request the at least one second base station to cooperatively perform wireless charging for a terminal — S101 in response to receiving response information for the cooperative charging request from a plurality of second base stations, determining at least one target base station capable of providing the cooperative charging configuration from the plurality of second base stations — S201 wirelessly charging the terminal in cooperation with the at least one target base station — S202 sending a cooperative charging request to at least one second base station to request the at least one second base station to cooperatively perform wireless charging for a terminal — S101

FIG. 1 sending a cooperative charging request to at least one second base station to request the at least one second base station to cooperatively perform wireless charging for a terminal — S101 in response to receiving response information for the cooperative charging request from a plurality of second base stations, determining at least one target base station capable of providing the cooperative charging configuration from the plurality of second base stations — S201 wirelessly charging the terminal in cooperation with the at least one target base station — S202

FIG. 2 sending a cooperative charging request to at least one second base station to request the at least one second base station to cooperatively perform wireless charging for a terminal — S101 in response to receiving response information for the cooperative charging request from a plurality of second base stations, determining at least one target base station capable of providing the cooperative charging configuration from the plurality of second base stations — S201 in response to presence of a plurality of target base stations, determining a target base station that is closest to the terminal from the plurality of target base stations — S301 wirelessly charging the terminal in cooperation with the target base station that is closest to the terminal — S302

REQUEST SENDING METHOD AND DEVICE AND REQUEST RECEIVING METHOD AND DEVICE

CROSS-REFERENCE TO RELATED APPLICATION

This application is a U.S. national phase application of International Application No. PCT/CN2021/089432, filed on Apr. 23, 2021, the content of which is hereby incorporated by reference in its entirety.

TECHNICAL FIELD

The disclosure relates to a field of communication technologies, in particular to a method for sending a request, a method for receiving a request, an apparatus for sending a request, an apparatus for receiving a request, a communication apparatus and a computer-readable storage medium.

BACKGROUND

With the development of cellular mobile communication technologies, especially with advances in millimeter wave communication technology, more and more antennas can be configured on a base station. For example, the 5G Massive Multiple Input Multiple Output (MIMO) technology needs to be implemented by using a large number of antennas. Some base stations can also provide wireless charging services for terminals based on the large number of antennas.

SUMMARY

According to a first aspect of the embodiments of the disclosure, a method for sending a request, applicable to a first base station, is provided. The method includes: sending a cooperative charging request to at least one second base station to request the at least one second base station to cooperatively perform wireless charging for a terminal.

According to a second aspect of the embodiments of the disclosure, a method for receiving a request, applicable to a second base station, is provided. The method includes: receiving a cooperative charging request from a first base station; and determining that the first base station requests the second base station to cooperatively perform wireless charging for a terminal based on the cooperative charging request.

According to a third aspect of the embodiments of the disclosure, a communication apparatus including a processor and a memory for storing computer programs is provided. When the computer programs are executed by the processor, the method for sending a request and/or the method for receiving a request is implemented.

BRIEF DESCRIPTION OF THE DRAWINGS

In order to clearly illustrate technical solutions of embodiments of the disclosure, a brief description of drawings used in the embodiments is given below. Obviously, the drawings in the following descriptions are only part of the embodiments of the disclosure, and for those skilled in the art, other drawings can be obtained according to these drawings without inventive work.

FIG. 1 is a schematic flowchart of a method for sending a request according to an embodiment of the disclosure.

FIG. 2 is a schematic flowchart of a method for sending a request according to another embodiment of the disclosure.

FIG. 3 is a schematic flowchart of a method for sending a request according to another embodiment of the disclosure.

DETAILED DESCRIPTION

Figure 4:
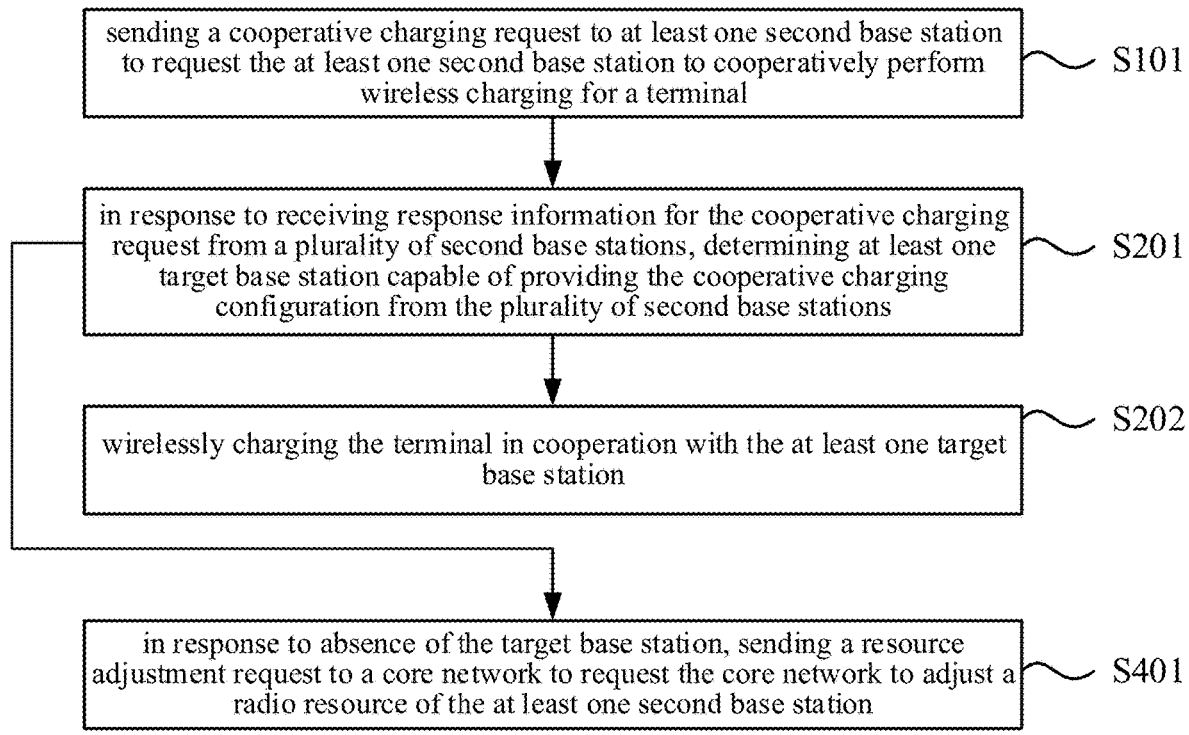
FIG. 4 is a schematic flowchart of a method for sending a request according to another embodiment of the disclosure.

The technical solutions in the embodiments of the disclosure will be clearly and completely described below in combination with the accompanying drawings in the embodiments of the disclosure. Obviously, the embodiments described here are only part of the embodiments of the disclosure and are not all embodiments of the disclosure. Based on the embodiments of the disclosure, other embodiments obtained by those skilled in the art without inventive work are within the protection scope of the disclosure.

The terms used in the embodiments of the disclosure are only for the purpose of describing specific embodiments, and are not intended to limit the disclosure. The singular forms of "a" and "the" used in the embodiments of the disclosure and appended claims are also intended to include plural forms, unless the context clearly indicates other meanings. It should also be understood that the term "and/or" as used herein refers to and includes any or all possible combinations of one or more associated listed items.

It should be understood that although the terms "first", "second", and "third" may be used in the embodiments of the disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

For purpose of simplicity and ease of understanding, the terms "greater than", "less than", "higher than" and "lower than" are used in the disclosure, to represent size relations. However, it can be understood by those skilled in the art that the term "greater than" also covers the meaning of "greater than or equal to", and "less than" also covers the meaning of "less than or equal to". The term "higher than" covers the meaning of "higher than or equal to", and the term "less than" also covers the meaning of "less than or equal to".

FIG. 1 is a schematic flowchart of a method for sending a request according to an embodiment of the disclosure. The method described in the embodiment is applicable to a first base station. The first base station may communicate with a terminal such as a user equipment, and may also communicate with a core network and a second base station. The terminal includes, but is not limited to, communication apparatuses such as a cell phone, a tablet computer, a wearable device, a sensor, an Internet of Things (IOT) device, and the like. The first base station and the second base station include, but are not limited to, base stations in different communication systems, such as 4G base stations, 5G base stations, 6G base stations, etc. The first base station and the second base station do not specifically refer to certain base stations, but rather to any two different base stations.

In an embodiment, the first base station and the second base station both have a wireless charging capability, to wirelessly charge the terminal based on the wireless charging capability.

In an embodiment, the wireless charging capability of the first base station and the second base station includes at least one of:
    an electromagnetic induction charging capability, an electromagnetic resonance charging capability, and a wireless radio frequency charging capability.

For example, the first base station has the wireless radio frequency charging capability, specifically the first base station has the air charging capability, the first base station is capable of transmitting energy in the form of millimeter waves and narrow bandwidth to the terminal through a plurality of antennas, and the terminal can receive the energy through a miniature beacon antenna and convert it into electrical energy for charging. With the wireless charging capability, the first base station can determine a location of the terminal, and transmit the energy to the terminal at that location for charging.

As illustrated in FIG. 1, the method for sending a request includes the following steps.

At step S101, a cooperative charging request is sent to at least one second base station to request the at least one second base station to cooperatively perform wireless charging for a terminal.

In an embodiment, the first base station may send the cooperative charging request to the at least one second base station as needed. For example, when the first base station receives a wireless charging request from the terminal, the first base station sends the cooperative charging request to the at least one second base station. For example, the first base station may determine whether it can charge the terminal wirelessly by itself, and if the wireless charging of the terminal cannot be accomplished alone, it sends the cooperative charging request to the at least one second base station.

In detail, a trigger condition for the first base station to send the cooperative charging request to the at least one second base station may be based on the actual situation. The at least one second base station may include one or more second base stations, which may be selected by the first base station according to its own needs. The second base station may be a neighboring base station of the first base station or a base station in the same tracking area as the first base station.

According to the embodiments of the disclosure, the first base station sends the cooperative charging request to the second base station to request the second base station to cooperatively perform wireless charging for the terminal, so that the first base station and the second base station can work cooperatively to wirelessly charge the terminal, which is conducive to ensuring that the charging needs of the terminal are satisfied, thereby smoothly completing wireless charging for the terminal.

In an embodiment, sending the cooperative charging request to the at least one second base station, includes:
    in response to determining a need of wirelessly charging the terminal in cooperation with the second base station, sending the cooperative charging request to the at least one second base station. That is, the first base station may send the cooperative charging request to the second base station only when it determines that wireless charging of the terminal needs to be carried out in cooperation with the second base station, for example, when the first base station is not able to carry out wireless charging of the terminal on its own, the first base station determines that it is required to carry out wireless charging of the terminal in cooperation with the second base station.

In an embodiment, the cooperative charging request carries at least one of the following information:
    a wireless charging capability of the first base station;
    a wireless charging capability of the second base station expected by the first base station; or
    a cooperative charging configuration for wirelessly charging the terminal in cooperation with the second base station expected by the first base station.

In an embodiment, the cooperative charging request may also carry auxiliary information for assisting the second base station in determining whether wireless charging can be performed for the terminal in cooperation with the first base station.

For example, if the auxiliary information includes the wireless charging capability of the first base station, the second base station may determine whether its own wireless charging capability matches the wireless charging capability of the first base station. For example, if the wireless charging capability of the first base station is the wireless radio frequency charging capability, and the wireless charging capability of the second base station is the electromagnetic resonance charging capability, it may be determined that the wireless charging capabilities of the two base stations do not match. For example, if the wireless charging capability of the first base station includes the wireless radio frequency charging capability, and the wireless charging capability of the second base station also includes the wireless radio frequency charging capability, it may be determined that the wireless charging capabilities of the two base stations do match. In this case, the second base station can wirelessly charge the terminal in cooperation with the first base station.

For example, if the auxiliary information includes the wireless charging capability of the second base station expected by the first base station, the second base station can determine whether its own wireless charging capability matches the wireless charging capability expected by the first base station. For example, if the wireless charging capability expected by the first base station is the wireless radio frequency charging capability, but the wireless charging capability of the second base station is the electromagnetic resonance charging capability, it may be determined that the wireless charging capabilities of the two base stations do not match. For example, if the wireless charging capability expected by the first base station is the wireless radio frequency charging capability, and the wireless charging capability of the second base station also includes the wireless radio frequency charging capability, it may be determined that the wireless charging capabilities of the two base stations do match. In this case, the second base station can wirelessly charge the terminal in cooperation with the first base station.

For example, if the auxiliary information includes the cooperative charging configuration for wirelessly charging the terminal in cooperation with the second base station expected by the first base station, the second base station can determine whether its own configuration for wireless charging matches the cooperative charging configuration expected by the first base station. For example, if the cooperative charging configuration expected by the first base station is to perform wireless charging for the terminal on a time domain resource T1, but the second base station can only perform wireless charging for the terminal on a time domain resource T2, and T2 does not fully contain T1, it may be determined that the two configurations do not match. If T2 fully contains T1, it may be determined that the two configurations do match. In this case, the second base station may wirelessly charge the terminal in cooperation with the first base station.

It is noted that the auxiliary information carried in the cooperative charging request, includes but is not limited to the above three types of information, which can be set as needed. The second base station may determine whether it is able to collaborate with the first base station to wirelessly charge the terminal according to one or more pieces of information in the auxiliary information.

In an embodiment, the cooperative charging configuration includes at least one of the followings:
 a time-division multiplexing (TDM) pattern, a charging power, a charging duration, or a charging resource.

In an embodiment, the second base station determines whether its own configuration for wireless charging matches the cooperative charging configuration expected by the first base station, if it is determined that the two configurations do match, the second base station may wirelessly charge the terminal in cooperation with the first base station.

In an embodiment, the second base station can wirelessly charge the terminal base on the cooperative charging configuration. For example, if the cooperative charging configuration expected by the first base station is to perform wireless charging for the terminal on the time domain resource T1, but the second base station can only perform wireless charging for the terminal on the time domain resource T2, and T2 fully contains T1, thus the second base station may determine that its own configuration for wireless charging matches the cooperative charging configuration expected by the first base station, and the second base station can wirelessly charge the terminal on the time domain resource T1 in cooperation with the first base station.

In an embodiment, the first base station can determine a charging resource A required by the terminal and a charging resource B that can be provided by the first base station, and determine whether the charging resource B can satisfy the charging resource A. If the charging resource A cannot be satisfied, it can be determined that it is difficult to satisfy the needs of the terminal if the first base station performs wireless charging for the terminal by itself, and thus it may be determined that it is necessary to carry out wireless charging for the terminal in cooperation with the second base station. The charging resource includes, but is not limited to, a time domain resource and a frequency domain resource.

For example, the first base station may determine a resource that can be used to wirelessly charge the terminal as the charging resource B according to its own load. In the case where the charging resource B fully contains the charging resource A, it may be determined that the charging resource B is capable of satisfying the charging resource A. In the case where the charging resource B does not fully contain the charging resource A, it may be determined that the charging resource B is not capable of satisfying the charging resource A, for example, the portion of the charging resource A that is not contained in the charging resource B may be further determined, for example, may be referred to as a charging resource a.

In an embodiment, the cooperative charging configuration for wirelessly charging the terminal in cooperation with the second base station expected by the first base station is determined according to the charging resource a. For example, if it is determined that the charging resource in the cooperative charging configuration includes the time domain resource T1, i.e., the first base station is not capable of wirelessly charging the terminal on the time domain resource T1, when the first base station wirelessly charges the terminal in cooperation with the second base station, wireless charging can be carried out by the second base station for the terminal on the time domain resource T1, to satisfy the charging needs of the terminal.

FIG. 2 is a schematic flowchart of a method for sending a request according to another embodiment of the disclosure. As illustrated in FIG. 2, according to the method described in claim 2, the cooperative charging request includes the cooperative charging configuration, and the method further includes the following steps.

At step S201, in response to receiving response information for the cooperative charging request from a plurality of second base stations, at least one target base station capable of providing the cooperative charging configuration is determined from the plurality of second base stations.

At step S202, the terminal is wirelessly charged in cooperation with the at least one target base station.

In an embodiment, after receiving the cooperative charging configuration in the cooperative charging request, the second base station may send the response information for the cooperative charging request to the first base station. The response information is configured to indicate whether the second base station supports the cooperative charging configuration.

The first base station may determine which second base stations can provide the cooperative charging configuration expected by the first base station according to the response information, and determine these second base stations as the target base stations, to wirelessly charge the terminal in cooperation with these target base stations.

FIG. 3 is a schematic flowchart of a method for sending a request according to another embodiment of the disclosure. As illustrated in FIG. 3, in response to presence of a plurality of target base stations, wirelessly charging the terminal in cooperation with the at least one target base station includes the following steps.

At step S301, in response to presence of a plurality of target base stations, the target base station that is closest to the terminal is determined from the plurality of target base stations.

At step S302, the terminal is wirelessly charged in cooperation with the target base station that is closest to the terminal.

In an embodiment, when there are a plurality of target base stations, the first base station may choose to collaborate with the plurality of target base stations to wirelessly charge the terminal, or the first base station may perform screening on the plurality of target base stations and then collaborate with the target base stations after the screening to wirelessly charge the terminal.

For example, the screening condition may be distance, the base station closest to the terminal may be determined as the target base station from the plurality of target base stations. Since the base station closest to the terminal has relatively few obstacles to the terminal in general, it is beneficial to ensure a good wireless charging effect by performing wireless charging for the terminal in cooperation with the target base station closest to the terminal.

It is noted that the screening condition is not limited to distance in the above embodiments. The target base station may be selected according to needs, for example, based on the signal quality.

FIG. 4 is a schematic flowchart of a method for sending a request according to another embodiment of the disclosure. As illustrated in FIG. 4, the method further includes the following steps.

At step S401, in response to absence of the target base station, a resource adjustment request is sent to a core network to request the core network to adjust a radio resource of the at least one second base station.

In an embodiment, when the first base station determines that there is no target base station in the plurality of second base stations that is capable of providing the cooperative charging configuration according to the response information of the second base station for the cooperative charging request, the first base station may send the resource adjustment request to the core network to request the core network to adjust the radio resource of the at least one second base station.

Generally, for the second base station capable of performing wireless charging, its inability to provide the cooperative charging configuration is not due to a lack of capacity, but rather due to the fact that the second base station does not have a suitable radio resource, for example, the second base station has used all of its wireless resources for communication.

Therefore, the first base station may request the core network to adjust the radio resource of the second base station, for example, by carrying the charging resource A required by the terminal and the charging resource B that can be provided by the first base station in the resource adjustment request and sending the resource adjustment request to the core network, or by directly carrying the charging resource a in the resource adjustment request and sending the resource adjustment request to the core network. Therefore, the core network can adjust the radio resources properly, so that at least one adjusted second base station is capable of providing the cooperative charging configuration to perform wireless charging for the terminal in cooperation with the first base station.

Figure 5:
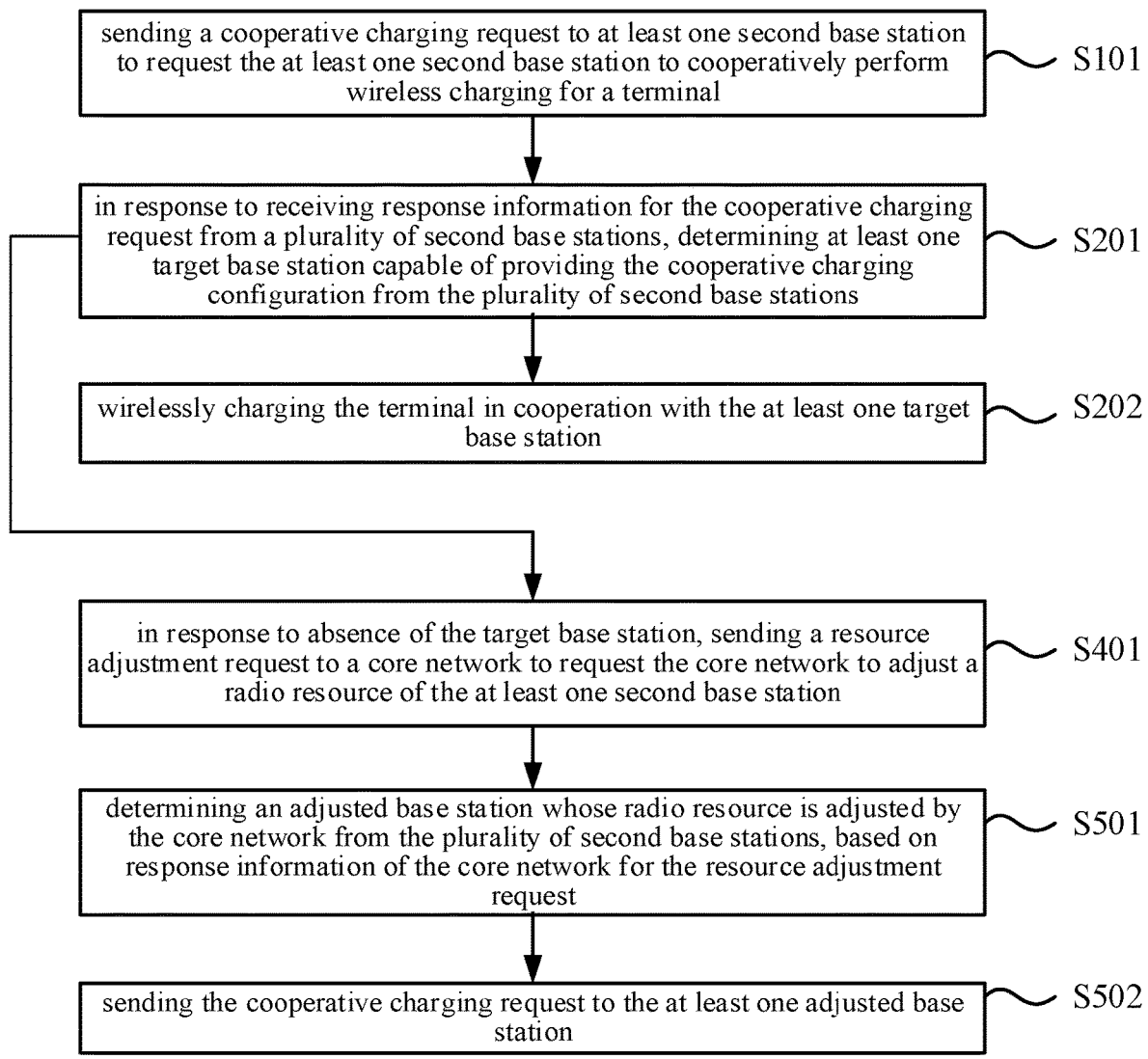
FIG. 5 is a schematic flowchart of a method for sending a request according to another embodiment of the disclosure.

FIG. 5 is a schematic flowchart of a method for sending a request according to another embodiment of the disclosure. As illustrated in FIG. 5, the method further includes the following steps.

At step S501, at least one adjusted base station whose radio resource is adjusted by the core network is determined from the at least one second base station based on response information of the core network for the resource adjustment request.

At step S502, the cooperative charging request is sent to the at least one adjusted base station.

In an embodiment, after receiving the resource adjustment request, the core network may feedback the response information for the resource adjustment request to the first base station, to inform the first base station whether the radio resource of the second base station has been adjusted. In the case where the radio resource of the second base station has been adjusted, the adjusted base station whose radio resource is adjusted may be further indicated, so that the first base station may only send the cooperative charging request to the adjusted base station, without sending the cooperative charging request to all the second base stations, which is conducive to saving the resource of the first base station.

Figure 6:
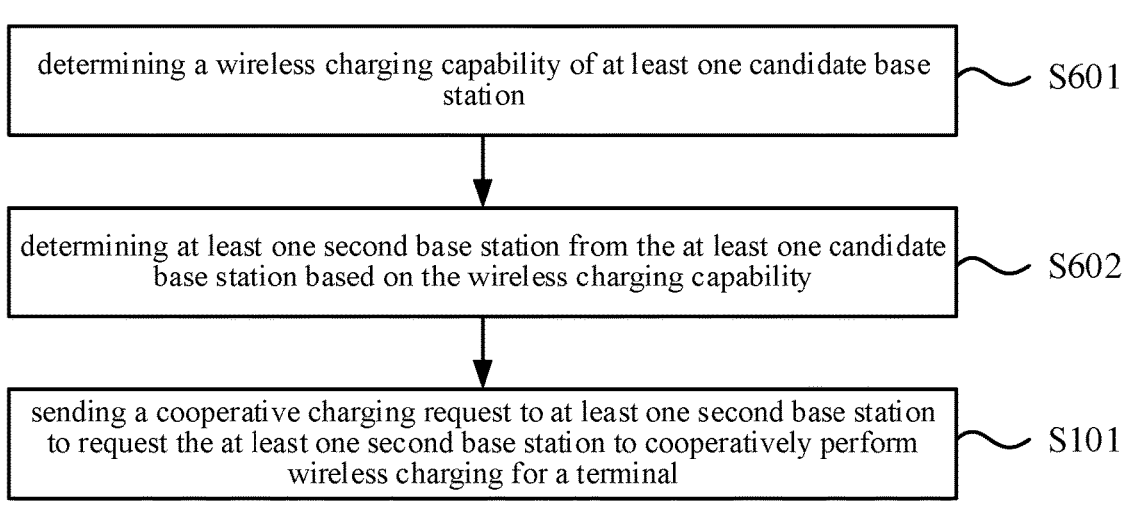
FIG. 6 is a schematic flowchart of a method for sending a request according to another embodiment of the disclosure.

FIG. 6 is a schematic flowchart of a method for sending a request according to another embodiment of the disclosure. As illustrated in FIG. 6, before sending the cooperative charging request to the second base station, the method further includes the following steps.

At step S601, a wireless charging capability of at least one candidate base station is determined.

At step S602, the at least one second base station is determined from the at least one candidate base station according to the wireless charging capability.

In an embodiment, the first base station may determine the wireless charging capability of the at least one candidate base station before sending the cooperative charging request to the second base station.

Determining the wireless charging capability of the at least one candidate base station, includes:
  obtaining the wireless charging capability from the candidate base station; and/or
  obtaining the wireless charging capability from a core network; and/or
  obtaining the wireless charging capability from the terminal.

For example, the first base station obtains the wireless charging capability directly from the candidate base station. The first base station may obtain the wireless charging capability by directly sending a wireless charging capability query signaling to the candidate base station through an interface between the base stations. Or the first base station may obtain the wireless charging capability of the candidate base station in the process of establishing an interface with the candidate base station. The candidate base station may be a neighboring base station of the first base station.

For example, the first base station obtains the wireless charging capability from the core network. The first base station may send the wireless charging capability query signaling to the core network to instruct the core network to query the wireless charging capabilities of certain base stations. For example, the core network may query the wireless charging capability of the neighboring base station of the first base station or query the wireless charging capability of a base station that is in the same tracking area as the first base station, and send a query result to the first base station.

For example, the first base station obtains the wireless charging capability from the terminal. The terminal may read the wireless charging capability of the candidate base station. For example, the candidate base station may broadcast its own wireless charging capability for the terminal to read. The terminal may be a terminal that supports wireless charging or a terminal that does not support wireless charging but can read the wireless charging capability. The terminal may be a terminal which needs to be wirelessly charged by the first base station, or may be another terminal connected to that base station.

Figure 7:
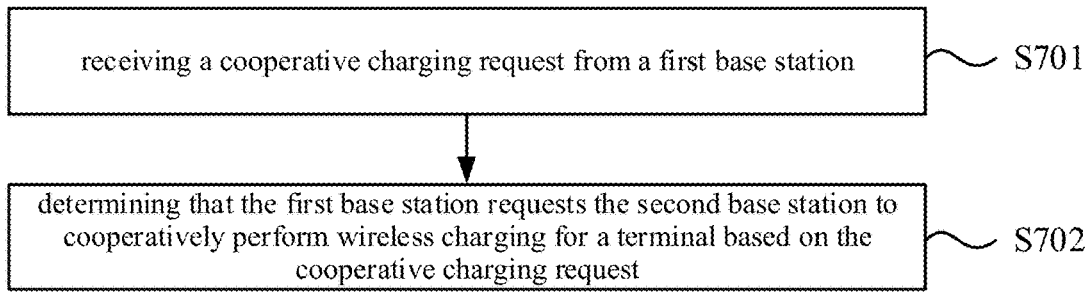
FIG. 7 is a schematic flowchart of a method for receiving a request according to an embodiment of the disclosure.

FIG. 7 is a schematic flowchart of a method for receiving a request according to an embodiment of the disclosure. The method described in the embodiment is applicable to a second base station. The second base station may communicate with the terminal such as a user equipment, and may also communicate with the core network and the first base station. The terminal includes, but is not limited to, communication apparatuses such as a cell phone, a tablet computer, a wearable device, a sensor, an IoT device, and the like. The first base station and the second base station include, but are not limited to, base stations in communication systems, such as 4G base stations, 5G base stations, 6G base stations, etc. The first base station and the second base station do not specifically refer to certain base stations, but rather to any two different base stations.

In an embodiment, the first base station and the second base station both have a wireless charging capability, to wirelessly charge the terminal based on the wireless charging capability.

In an embodiment, the wireless charging capability of the first base station and the second base station includes at least one of:
an electromagnetic induction charging capability, an electromagnetic resonance charging capability, or a wireless radio frequency charging capability.

For example, the first base station has the wireless radio frequency charging capability, specifically the first base station has the air charging capability, the first base station is capable of transmitting energy in the form of millimeter waves and narrow bandwidth to the terminal through a plurality of antennas, and the terminal can receive the energy through a miniature beacon antenna and convert it into electrical energy for charging. With the wireless charging capability, the first base station can determine a location of the terminal, and transmit the energy to the terminal at that location for charging.

As illustrated in FIG. 7, the method for receiving a request may include the following steps.

At step S701, a cooperative charging request is received from a first base station.

At step S702, it is determined that the first base station requests the second base station to cooperatively perform wireless charging for a terminal based on the cooperative charging request.

In an embodiment, the first base station may send the cooperative charging request to the second base station as needed. For example, when the first base station receives a wireless charging request from the terminal, the first base station sends the cooperative charging request to the second base station. For example, the first base station may determine whether it can charge the terminal wirelessly by itself, and if the wireless charging of the terminal cannot be accomplished alone, it sends the cooperative charging request to the second base station.

In detail, a trigger condition for the first base station to send the cooperative charging request to the second base station may be based on the actual situation. There could be one or more second base stations, which may be selected by the first base station according to its own needs. For example, the second base station may be a neighboring base station of the first base station or a base station in the same tracking area as the first base station.

According to the embodiments of the disclosure, the first base station sends the cooperative charging request to the second base station to request the second base station to cooperatively perform wireless charging for the terminal, so that the first base station and the second base station can work cooperatively to wirelessly charge the terminal, which is conducive to ensuring that the charging needs of the terminal are satisfied, thereby smoothly completing wireless charging for the terminal.

In an embodiment, the method further includes:
determining to carry at least one of the following information based on the cooperative charging request:
a wireless charging capability of the first base station;
a wireless charging capability of the second base station expected by the first base station; or
a cooperative charging configuration for wirelessly charging the terminal in cooperation with the second base station expected by the first base station.

In an embodiment, the cooperative charging request may also carry auxiliary information for assisting the second base station in determining whether wireless charging can be performed for the terminal in cooperation with the first base station.

For example, if the auxiliary information includes the wireless charging capability of the first base station, the second base station may determine whether its own wireless charging capability matches the wireless charging capability of the first base station. For example, if the wireless charging capability of the first base station is the wireless radio frequency charging capability, and the wireless charging capability of the second base station is the electromagnetic resonance charging capability, it may be determined that the wireless charging capabilities of the two base stations do not match. For example, if the wireless charging capability of the first base station includes the wireless radio frequency charging capability, and the wireless charging capability of the second base station also includes the wireless radio frequency charging capability, it may be determined that the wireless charging capabilities of the two base stations do match. In this case, the second base station can wirelessly charge the terminal in cooperation with the first base station.

For example, if the auxiliary information includes the wireless charging capability of the second base station expected by the first base station, the second base station can determine whether its own wireless charging capability matches the wireless charging capability expected by the first base station. For example, if the wireless charging capability expected by the first base station is the wireless radio frequency charging capability, but the wireless charging capability of the second base station is the electromagnetic resonance charging capability, it may be determined that the wireless charging capabilities of the two base stations do not match. For example, if the wireless charging capability expected by the first base station is the wireless radio frequency charging capability, and the wireless charging capability of the second base station also includes the wireless radio frequency charging capability, it may be determined that the wireless charging capabilities of the two base stations do match. In this case, the second base station can wirelessly charge the terminal in cooperation with the first base station.

For example, if the auxiliary information includes the cooperative charging configuration for wirelessly charging the terminal in cooperation with the second base station expected by the first base station, the second base station can determine whether its own cooperative charging configuration for performing wireless charging matches the cooperative charging configuration expected by the first base station. For example, if the cooperative charging configuration expected by the first base station is to perform wireless charging for the terminal on a time domain resource T1, but the second base station can only perform wireless charging for the terminal on a time domain resource T2, and T2 does not fully contain T1, it may be determined that the two configurations do not match. If T2 fully contains T1, it may be determined that the two configurations do match. In this case, the second base station may wirelessly charge the terminal in cooperation with the first base station.

It is noted that the auxiliary information carried in the cooperative charging request, includes but is not limited to the above three types of information, which can be set as needed. The second base station may determine whether it is able to collaborate with the first base station to wirelessly charge the terminal according to one or more pieces of information in the auxiliary information.

In an embodiment, the cooperative charging configuration includes at least one of the followings:

a TDM pattern, a charging power, a charging duration, or a charging resource.

In an embodiment, the second base station determines whether its own cooperative charging configuration for performing wireless charging matches the cooperative charging configuration expected by the first base station, if it is determined that the two configurations do match, the second base station may wirelessly charge the terminal in cooperation with the first base station.

In an embodiment, the second base station can wirelessly charge the terminal base on the cooperative charging configuration. For example, if the cooperative charging configuration expected by the first base station is to perform wireless charging for the terminal on the time domain resource T1, but the second base station can only perform wireless charging for the terminal on the time domain resource T2, and T2 fully contains T1, thus the second base station may determine that its own cooperative charging configuration for performing wireless charging matches the cooperative charging configuration expected by the first base station, and the second base station can wirelessly charge the terminal on the time domain resource T1 in cooperation with the first base station.

In an embodiment, the first base station can determine a charging resource A required by the terminal and a charging resource B that can be provided by the first base station, and determine whether the charging resource B can satisfy the charging resource A. If the charging resource A cannot be satisfied, it can be determined that it is difficult to satisfy the needs of the terminal if the first base station performs wireless charging for the terminal by itself, and thus it may be determined that it is necessary to carry out wireless charging for the terminal in cooperation with the second base station. The charging resource includes, but is not limited to, a time domain resource and a frequency domain resource.

For example, the first base station may determine a resource that can be used to wirelessly charge the terminal as the charging resource B according to its own load. In the case where the charging resource B fully contains the charging resource A, it may be determined that the charging resource B is capable of satisfying the charging resource A. In the case where the charging resource B does not fully contain the charging resource A, it may be determined that the charging resource B is not capable of satisfying the charging resource A, for example, the portion of the charging resource A that is not contained in the charging resource B may be further determined, for example, may be referred to as a charging resource a.

In an embodiment, the cooperative charging configuration for wirelessly charging the terminal in cooperation with the second base station expected by the first base station is determined according to the charging resource a. For example, if it is determined that the charging resource in the cooperative charging configuration includes the time domain resource T1, i.e., the first base station is not capable of wirelessly charging the terminal on the time domain resource T1, when the first base station wirelessly charges the terminal in cooperation with the second base station, wireless charging can be carried out by the second base station for the terminal on the time domain resource T1, to satisfy the charging needs of the terminal.

Figure 8:
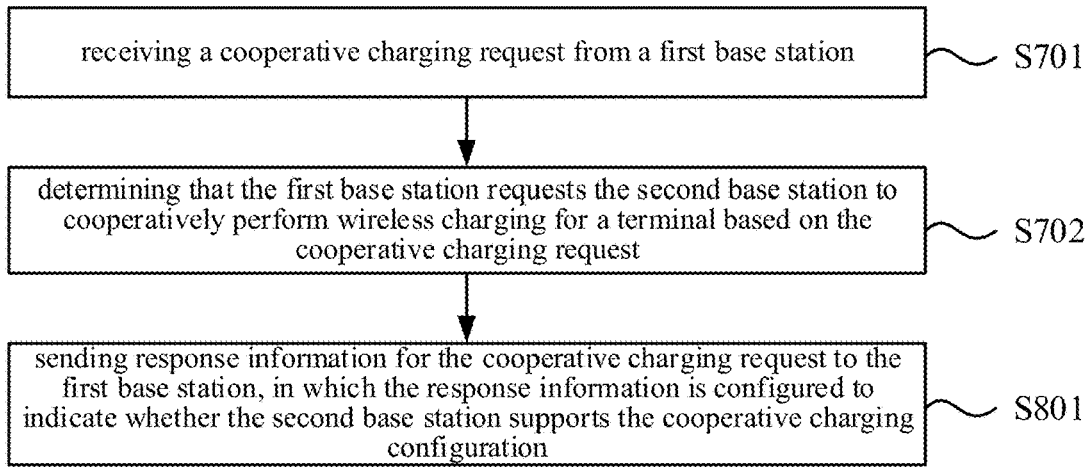
FIG. 8 is a schematic flowchart of a method for receiving a request according to another embodiment of the disclosure.

FIG. 8 is a schematic flowchart of a method for receiving a request according to another embodiment of the disclosure. As illustrated in FIG. 8, the cooperative charging request includes the cooperative charging configuration, and the method further includes the following steps.

At step S801, response information for the cooperative charging request is sent to the first base station, in which the response information is configured to indicate whether the second base station supports the cooperative charging configuration.

In an embodiment, after receiving the cooperative charging configuration in the cooperative charging request, the second base station may send the response information for the cooperative charging request to the first base station, to indicate whether the second base station supports the cooperative charging configuration through the response information.

The first base station may determine which second base stations can provide the cooperative charging configuration expected by the first base station according to the response information, and determine these second base stations as the target base stations, to wirelessly charge the terminal in cooperation with these target base stations.

Figure 9:
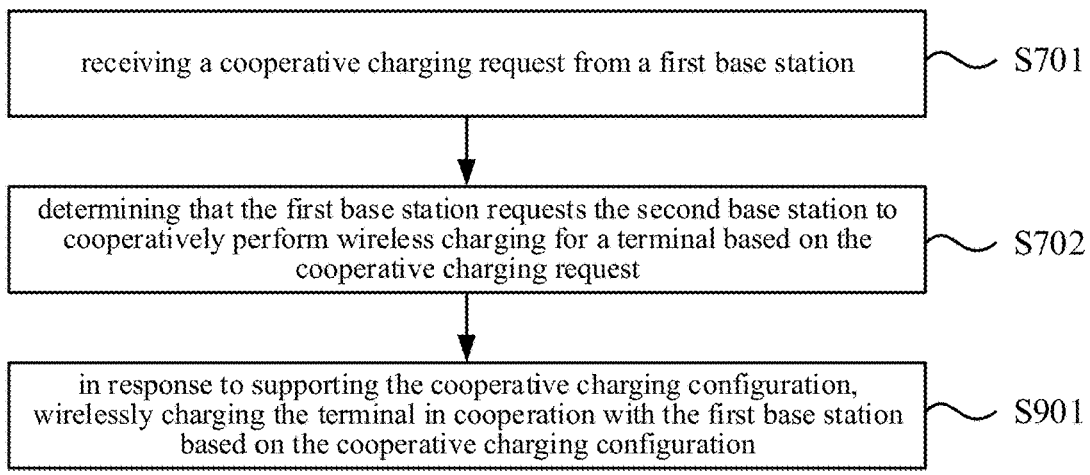
FIG. 9 is a schematic flowchart of a method for receiving a request according to another embodiment of the disclosure.

FIG. 9 is a schematic flowchart of a method for receiving a request according to another embodiment of the disclosure. As illustrated in FIG. 9, the method further includes the following steps.

At step S901, in response to supporting the cooperative charging configuration, the terminal is wirelessly charged in cooperation with the first base station based on the cooperative charging configuration.

In an embodiment, if it is determined that the second base station supports the cooperative charging configuration, the second base station can wirelessly charge the terminal in cooperation with the first base station based on the cooperative charging configuration, which is conducive to ensuring that the charging needs of the terminal are satisfied, so as to smoothly complete wireless charging of the terminal.

For example, the first base station may determine a resource that can be used to wirelessly charge the terminal as the charging resource B according to its own load. In the case where the charging resource B does not fully contain the charging resource A, it may be determined that the charging resource B is not capable of satisfying the charging resource A, and the portion of the charging resource A that is not contained in the charging resource B may be further determined, for example, may be referred to as the charging resource a. The charging resource a is sent to the second base station as the expected cooperative charging configuration.

In the case where the second base station is capable of supporting the cooperative charging configuration, it can wirelessly charge the terminal in cooperation with the first base station based on the cooperative charging configuration. For example, the second base station can wirelessly charge the terminal on the charging resource a, and the first base station can wirelessly charge the terminal on the charging resource A, so as to realize wireless charging for the terminal on the entire charging resource B required by the terminal, which is conducive to ensuring that the charging needs of the terminal are satisfied, and thus wireless charging of the terminal is smoothly accomplished.

The embodiments of the disclosure also provide a method for receiving a signal. The method is applicable to the terminal. The terminal may be used as a user equipment to communicate with the first base station or the second base station.

The terminal includes, but is not limited to, communication apparatuses such as a cell phone, a tablet computer, a wearable device, a sensor, an IoT device, and the like. The first base station and the second base station include, but are not limited to, base stations in different communication systems, such as 4G base stations, 5G base stations, 6G base stations, etc. The first base station and the second base station do not specifically refer to certain base stations, but rather to any two different base stations.

The method for receiving a signal includes:
receiving a wireless charging signal for cooperative charging from the first base station and the second base station as described in any of the above embodiments for wireless charging.

Corresponding to the embodiments of the method for sending a request and the method for receiving a request, the disclosure also provides embodiments of the apparatus for sending a request and the apparatus for receiving a request.

Figure 10:
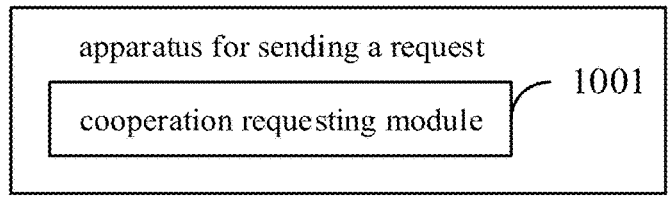
FIG. 10 is a schematic block diagram of an apparatus for sending a request according to an embodiment of the disclosure.

FIG. 10 is a schematic block diagram of an apparatus for sending a request according to an embodiment of the disclosure. The apparatus is applicable to a first base station. The first base station may communicate with the terminal such as a user equipment, and may also communicate with a core network and a second base station. The terminal includes, but is not limited to, communication apparatuses such as a cell phone, a tablet computer, a wearable device, a sensor, an IoT device, and the like. The first base station and the second base station include, but are not limited to, base stations in different communication systems, such as 4G base stations, 5G base stations, 6G base stations, etc. The first base station and the second base station do not specifically refer to certain base stations, but rather to any two different base stations.

As illustrated in FIG. 10, the apparatus for sending a request includes: a cooperation requesting module 1001.

The cooperation requesting module 1001 is configured to send a cooperative charging request to at least one second base station to request the at least one second base station to cooperatively perform wireless charging for a terminal.

In an embodiment, a cooperation requesting module 1001 is configured to: in response to determining a need of wirelessly charging the terminal in cooperation with the second base station, send the cooperative charging request to the at least one second base station.

In an embodiment, the cooperative charging request carries at least one of the following information: a wireless charging capability of the first base station; a wireless charging capability of the at least one second base station expected by the first base station; or a cooperative charging configuration for wirelessly charging the terminal in cooperation with the at least one second base station expected by the first base station.

In an embodiment, the cooperative charging configuration includes at least one of the followings: a TDM pattern, a charging power, a charging duration, or a charging resource.

Figure 11:
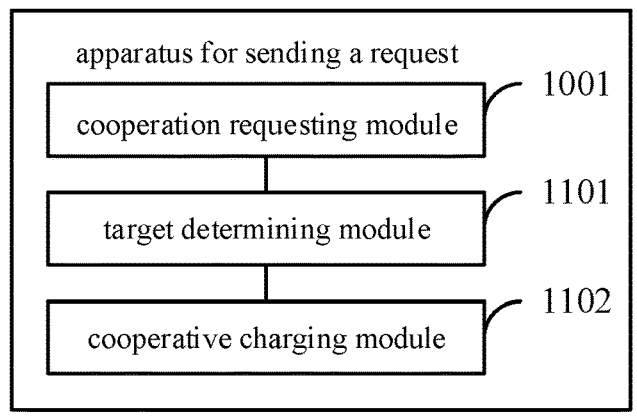
FIG. 11 is a schematic block diagram of an apparatus for sending a request according to another embodiment of the disclosure.

FIG. 11 is a schematic block diagram of an apparatus for sending a request according to another embodiment of the disclosure. As illustrated in FIG. 11, the cooperative charging request includes the cooperative charging configuration, the apparatus further includes: a target determining module 1101 and a cooperative charging module 1102. The target determining module 1101 is configured to: in response to receiving response information for the cooperative charging request from a plurality of second base stations, determine at least one target base station that can provide the cooperative charging configuration from the plurality of second base stations. The cooperative charging module 1102 is configured to: wirelessly charge the terminal in cooperation with the at least one target base station.

In an embodiment, the cooperative charging module is configured to: in response to presence of a plurality of target base stations, determine a target base station that is closest to the terminal from the plurality of target base stations; and wirelessly charge the terminal in cooperation with the target base station that is closest to the terminal.

Figure 12:
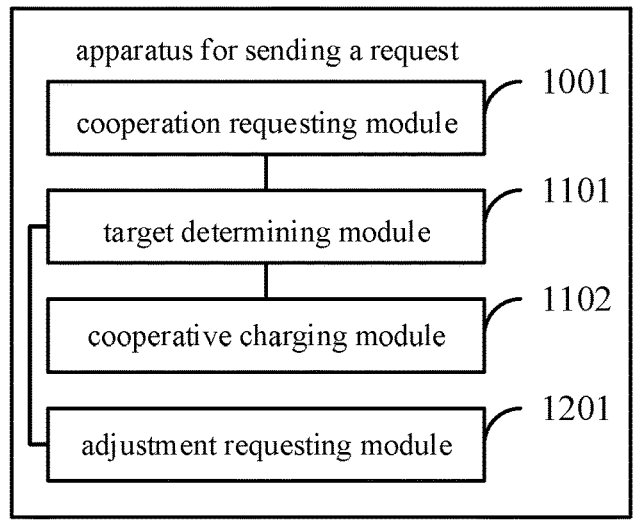
FIG. 12 is a schematic block diagram of an apparatus for sending a request according to another embodiment of the disclosure.

FIG. 12 is a schematic block diagram of an apparatus for sending a request according to another embodiment of the disclosure. As illustrated in FIG. 12, the apparatus further includes: an adjustment requesting module 1201, configured to: in response to absence of the target base station, send a resource adjustment request to a core network to request the core network to adjust a radio resource of the at least one second base station.

Figure 13:
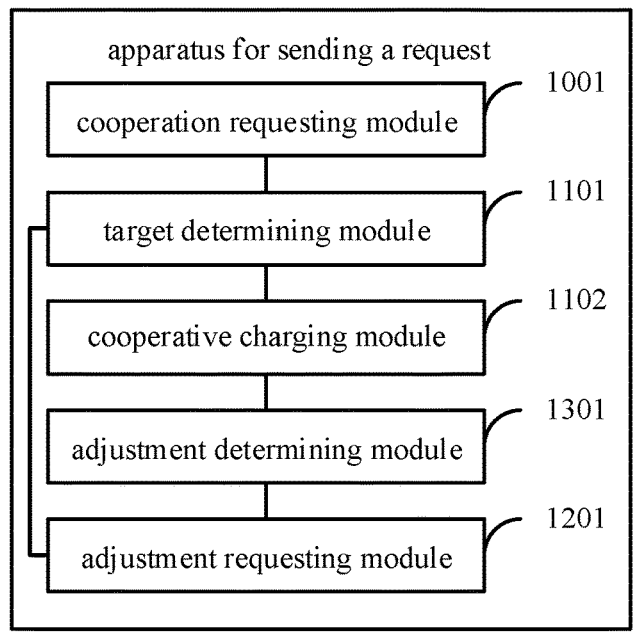
FIG. 13 is a schematic block diagram of an apparatus for sending a request according to another embodiment of the disclosure.

FIG. 13 is a schematic block diagram of an apparatus for sending a request according to another embodiment of the disclosure. As illustrated in FIG. 13, the apparatus further includes: an adjustment determining module 1301, configured to determine at least one adjusted base station whose radio resource is adjusted by the core network from the at least one second base station, based on response information of the core network for the resource adjustment request. The cooperative charging module 1102 is further configured to: send the cooperative charging request to the at least one adjusted base station.

Figure 14:
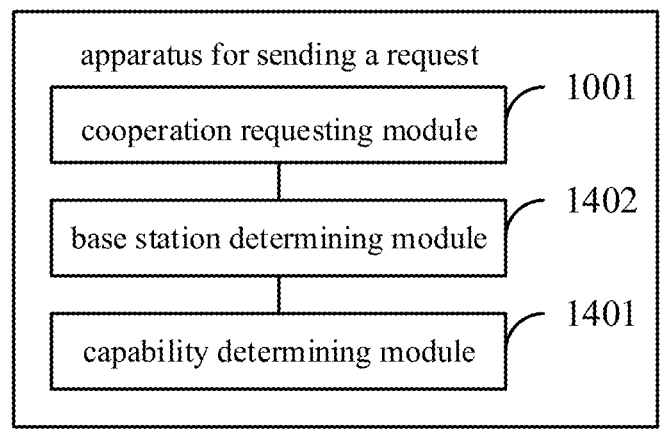
FIG. 14 is a schematic block diagram of an apparatus for sending a request according to another embodiment of the disclosure.

FIG. 14 is a schematic block diagram of an apparatus for sending a request according to another embodiment of the disclosure. As illustrated in FIG. 14, the apparatus further includes: a capability determining module 1401 and a base station determining module 1402. The capability determining module 1401 is configured to determine a wireless charging capability of at least one candidate base station. The base station determining module 1402 is configured to determine the at least one second base station from the at least one candidate base station based on the wireless charging capability.

In an embodiment, the capability determining module is configured to: obtain the wireless charging capability from the at least one candidate base station; and/or obtain the wireless charging capability from a core network; and/or obtain the wireless charging capability from the terminal.

Figure 15:
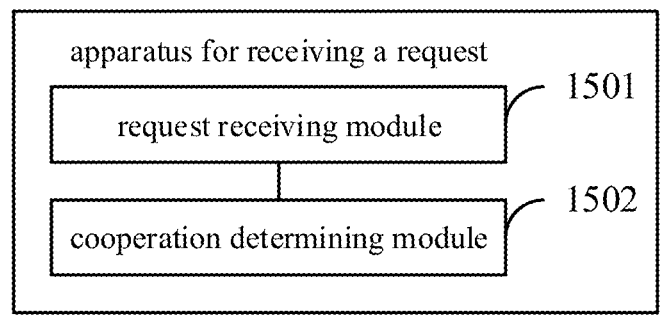
FIG. 15 is a schematic block diagram of an apparatus for receiving a request according to an embodiment of the disclosure.

FIG. 15 is a schematic block diagram of an apparatus for receiving a request according to an embodiment of the disclosure. The apparatus is applicable to a second base station. The second base station may communicate with a terminal such as a user equipment, and may also communicate with a core network and a first base station. The terminal includes, but is not limited to, communication apparatuses such as a cell phone, a tablet computer, a wearable device, a sensor, an IoT device, and the like. The first base station and the second base station include, but are not limited to, base stations in different communication systems, such as 4G base stations, 5G base stations, 6G base stations, etc. The first base station and the second base station do not specifically refer to certain base stations, but rather to any two different base stations.

As illustrated in FIG. 15, the apparatus for receiving a request includes: a request receiving module 1501 and a cooperation determining module 1502. The request receiving module 1501 is configured to receive a cooperative charging request from a first base station. The cooperation determining module 1502 is configured to determine that the first base station requests the second base station to cooperatively perform wireless charging for a terminal based on the cooperative charging request.

Figure 16:
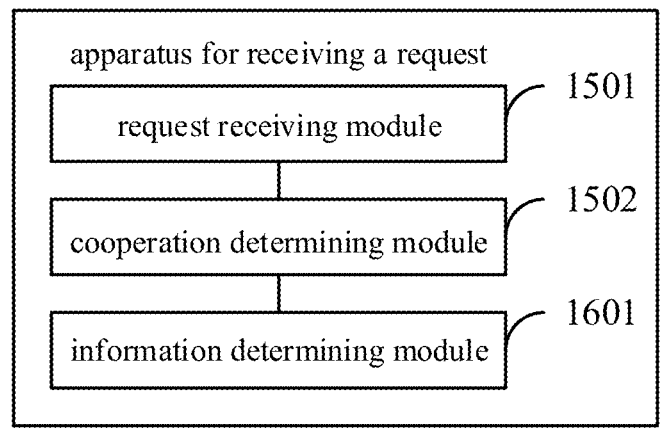
FIG. 16 is a schematic block diagram of an apparatus for receiving a request according to another embodiment of the disclosure.

FIG. 16 is a schematic block diagram of an apparatus for receiving a request according to another embodiment of the disclosure. As illustrated in FIG. 16, the apparatus further includes: an information determining module 1601, configured to: determine to carry at least one of the following information based on the cooperative charging request: a wireless charging capability of the first base station; a wireless charging capability of the second base station expected by the first base station; or a cooperative charging configuration for wirelessly charging the terminal in cooperation with the second base station expected by the first base station.

In an embodiment, the cooperative charging configuration includes at least one of the followings: a TDM pattern, a charging power, a charging duration, or a charging resource.

Figure 17:
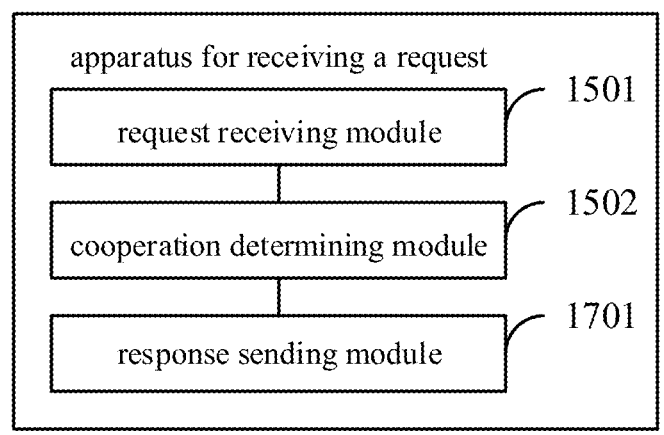
FIG. 17 is a schematic block diagram of an apparatus for receiving a request according to another embodiment of the disclosure.

FIG. 17 is a schematic block diagram of an apparatus for receiving a request according to another embodiment of the disclosure. As illustrated in FIG. 17, the cooperative charging request includes the cooperative charging configuration, the apparatus further includes: a response sending module 1701, configured to: send response information for the cooperative charging request to the first base station, in which the response information is configured to indicate whether the second base station supports the cooperative charging configuration.

Figure 18:
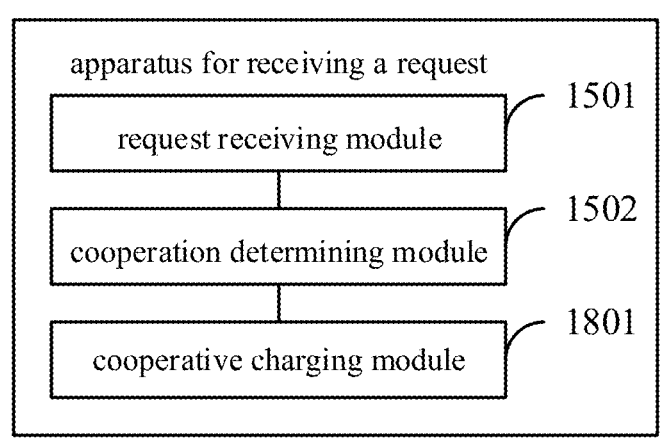
FIG. 18 is a schematic block diagram of an apparatus for receiving a request according to another embodiment of the disclosure.

FIG. 18 is a schematic block diagram of an apparatus for receiving a request according to another embodiment of the disclosure. As illustrated in FIG. 18, the apparatus further includes: a cooperative charging module 1801, configured to: in response to supporting the cooperative charging configuration, wirelessly charge the terminal in cooperation with the first base station based on the cooperative charging configuration.

With respect to the device in the above embodiments, the specific manner in which each module performs an operation has been described in detail in the relevant method embodiments, and will not be described in detail herein.

Since the apparatus embodiments basically correspond to the method embodiments, relevant contents can refer to partial description of the method embodiments. The apparatus embodiments described above are merely schematic, in which the modules described as separate components may or may not be physically separated, and the components shown as modules may or may not be physical modules, i.e., they may be located in a single place or may be distributed to a plurality of network modules. Some or all of these modules may be selected according to actual needs to fulfill the purpose of the solution of the embodiments, which can be understood and implemented by those skilled in the art without creative labor.

The embodiments of the disclosure further provide a communication apparatus. The communication apparatus includes:
a processor;
a memory for storing computer programs; in which
when the computer programs are executed by the processor, the method for sending a request of any of the above embodiments and/or the method for receiving a request of any of the above embodiments is implemented.

The embodiments of the disclosure further provide a computer-readable storage medium for storing computer programs. When the computer programs are executed by a processor, steps in the method for sending a request of any of the above embodiments and/or the method for receiving a request of any of the above embodiments are implemented.

Figure 19:
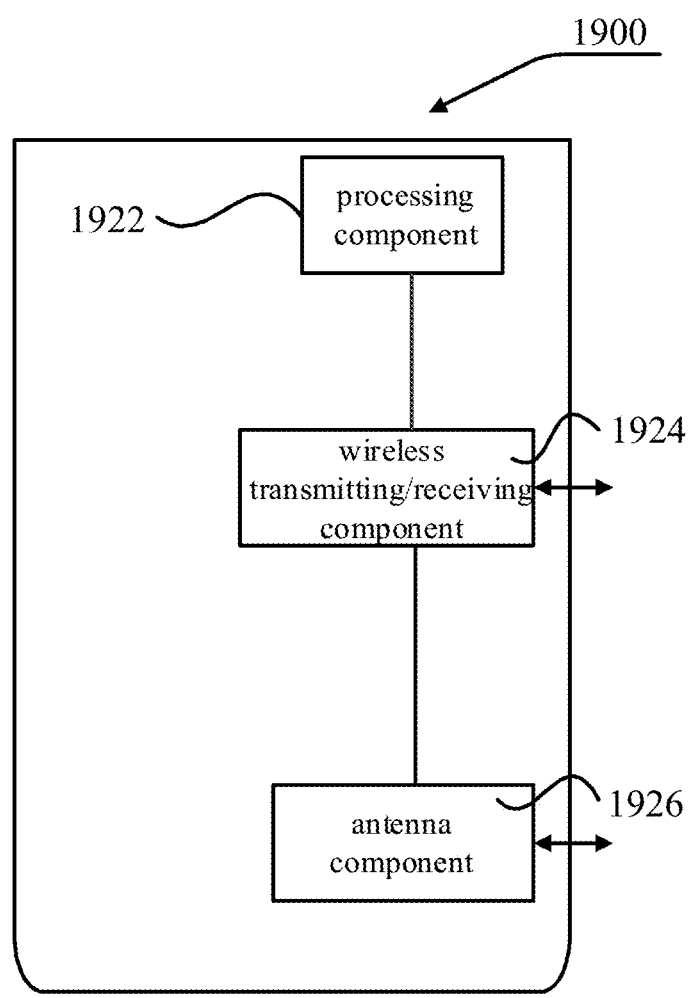
FIG. 19 is a schematic block diagram of an apparatus for sending and/or receiving a request according to an embodiment of the disclosure.

As illustrated in FIG. 19, FIG. 19 is a schematic block diagram of an apparatus 1900 for sending and/or receiving a request according to an embodiment of the disclosure. The apparatus 1900 may be provided as a base station. As illustrated in FIG. 19, the apparatus 1900 includes a processing component 1922, a wireless transmitting/receiving component 1924, an antenna component 1926, and a signal processing portion specific to a wireless interface. The processing component 1922 may further include one or more processors. One of the processors in the processing component 1922 may be configured to implement the method for sending a request of any of the above embodiments and/or the method for receiving a request of any of the above embodiments.

Figure 20:
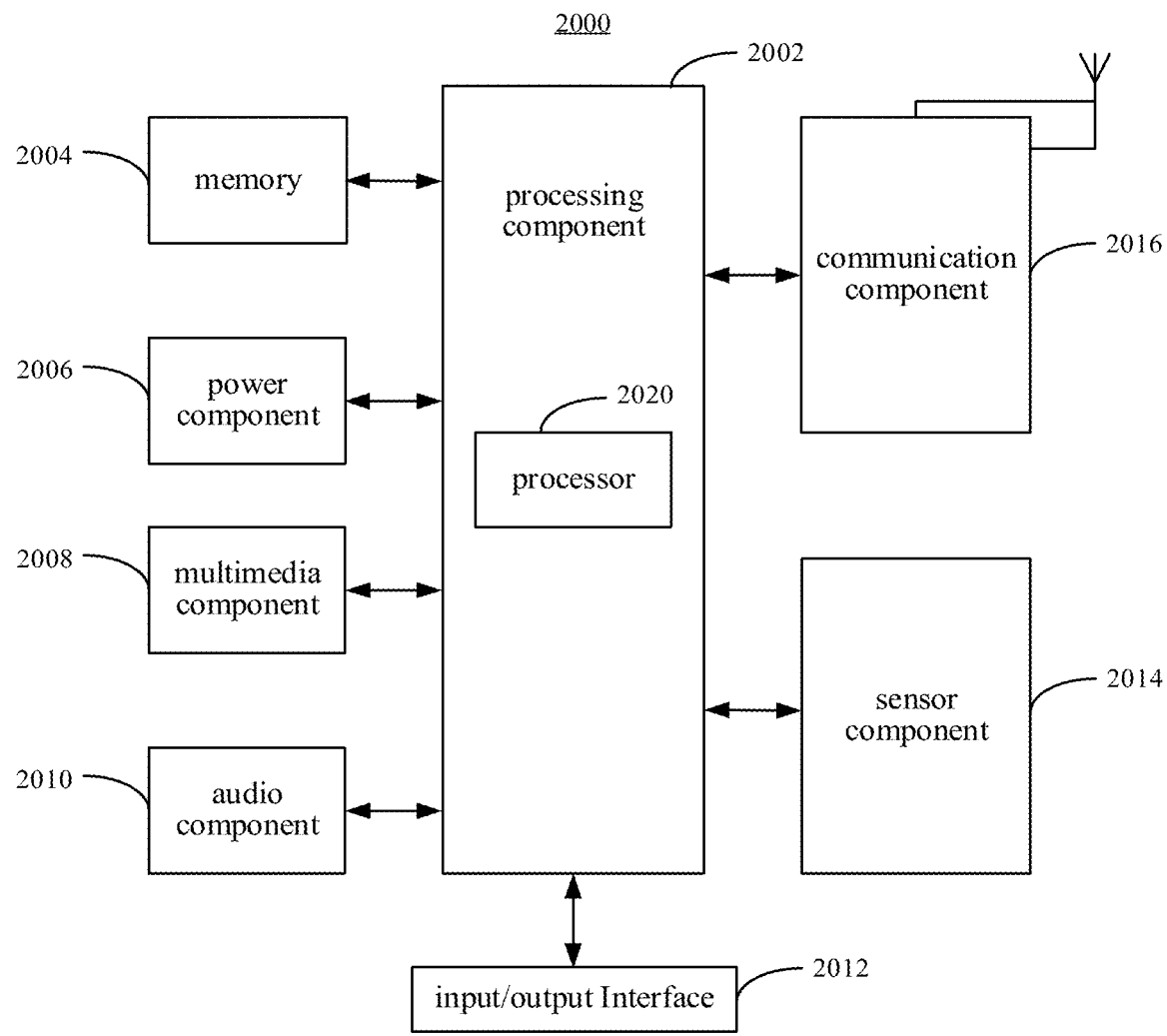
FIG. 20 is a schematic block diagram of an apparatus for receiving a signal according to an embodiment of the disclosure.

FIG. 20 is a schematic block diagram of an apparatus 2000 for receiving a signal according to an embodiment of the disclosure. For example, the apparatus 2000 may be a mobile phone, a computer, a digital broadcasting terminal, a message transceiver device, a game console, a tablet device, a medical device, a fitness device and a personal digital assistant.

As illustrated in FIG. 20, the apparatus 2000 may include one or more of the following components: a processing component 2002, a memory 2004, a power component 2006, a multimedia component 2008, an audio component 2010, an input/output (I/O) interface 2012, a sensor component 2014, and a communication component 2016.

The processing component 2002 typically controls overall operations of the apparatus 2000, such as the operations associated with display, telephone calls, data communications, camera operations, and recording operations. The processing component 2002 may include one or more processors 2020 to execute instructions to implement all or part of the steps in the above described method. Moreover, the processing component 2002 may include one or more modules which facilitate the interaction between the processing component 2002 and other components. For example, the processing component 2002 may include a multimedia module to facilitate the interaction between the multimedia component 2008 and the processing component 2002.

The memory 2004 is configured to store various types of data to support the operation of the apparatus 2000. Examples of such data include instructions for any applications or methods operated on the apparatus 2000, contact data, phonebook data, messages, pictures, video, etc. The memory 2004 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic or optical disk.

The power component 2006 provides power to various components of the apparatus 2000. The power component 2006 may include a power management system, one or more power sources, and any other components associated with the generation, management, and distribution of power in the apparatus 2000.

The multimedia component 2008 includes a screen providing an output interface between the apparatus 2000 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensor may not only sense a boundary of a touch or swipe action, but also sense a period of time and a pressure associated with the touch or swipe action. In some embodiments, the multimedia component 2008 includes a front-facing camera and/or a rear-facing camera. When the apparatus 2000 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 2010 is configured to output and/or input audio signals. For example, the audio component 2010 includes a microphone (MIC) configured to receive an external audio signal when the apparatus 2000 is in an operation mode, such as a call mode, a recording mode, and a voice recognition mode. The received audio signal may be further stored in the memory 2004 or transmitted via the communication component 2016. In some embodiments, the audio component 2010 further includes a speaker to output audio signals.

The I/O interface 2012 provides an interface between the processing component 2002 and peripheral interface modules, such as a keyboard, a click wheel, buttons, and the like. The buttons may include, but are not limited to, a home button, a volume button, a starting button, and a locking button.

The sensor component 2014 includes one or more sensors to provide status assessments of various aspects of the apparatus 2000. For instance, the sensor component 2014 may detect an open/closed status of the apparatus 2000, relative positioning of components, e.g., the display and the keypad, of the apparatus 2000, a change in position of the apparatus 2000 or a component of the apparatus 2000, a presence or absence of user contact with the apparatus 2000, an orientation or an acceleration/deceleration of the apparatus 2000, and a change in temperature of the apparatus 2000. The sensor component 2014 may include a proximity sensor configured to detect the presence of nearby objects without any physical contact. The sensor component 2014 may also include a light sensor, such as a Complementary Metal Oxide Semiconductor (CMOS) or Charge-Coupled Device (CCD) image sensor, for use in imaging applications. In some embodiments, the sensor component 2014 may also include an accelerometer sensor, a gyroscope sensor, a magnetic sensor, a pressure sensor, or a temperature sensor.

The communication component 2016 is configured to facilitate communication, wired or wirelessly, between the apparatus 2000 and other devices. The apparatus 2000 can access a wireless network based on a communication standard, such as Wi-Fi, 2G or 3G, 4G LTE, 5G NR or a combination thereof. In an exemplary embodiment, the communication component 2016 receives a broadcast signal or broadcast associated information from an external broadcast management system via a broadcast channel. In an exemplary embodiment, the communication component 2016 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the exemplary embodiment, the apparatus 2000 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described methods.

In an exemplary embodiment, there is also provided a non-transitory computer readable storage medium including executable instructions, such as the memory 2004. The above instructions may be executed by the processor 2020 in the apparatus 2000, for performing the above methods. For example, the non-transitory computer-readable storage medium may be a ROM, a Random Access Memory (RAM), a CD-ROM, a magnetic tape, a floppy disc, and an optical data storage device.

Other embodiments of the disclosure will be apparent to those skilled in the art from consideration of the specification and practice of the disclosure disclosed here. The disclosure is intended to cover any variations, uses, or adaptations of the embodiments of the disclosure following the general principles thereof and including such departures from the disclosure as come within known or customary practice in the art. It is intended that the specification and embodiments are considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

The above detailed description of the methods and devices provided by the embodiments of the disclosure is provided herein, and specific examples are applied herein to illustrate the principles and implementations of the disclosure, and the above illustrations of the embodiments are only used to assist in the understanding of the methods of the disclosure and the core ideas thereof. Meanwhile, for those skilled in the art, based on the ideas of the disclosure, there will be changes in the specific implementations and the scope of application, and in summary, the contents of the specification should not be construed as a limitation on the disclosure.

The invention claimed is:

1. A method for sending a request, performed by a first base station, comprising:
   sending a cooperative charging request to at least one second base station to request the at least one second base station to cooperatively perform wireless charging for a terminal;
   wherein the cooperative charging request carries a cooperative charging configuration for wirelessly charging the terminal in cooperation with the at least one second base station expected by the first base station;
   wherein the cooperative charging request comprises the cooperative charging configuration, the method further comprises:
   receiving first response information for the cooperative charging request from a plurality of second base stations including the at least one second base station;
   determining at least one target base station capable of providing the cooperative charging configuration among the plurality of second base stations; and
   wirelessly charging the terminal in cooperation with the at least one target base station;
   the method further comprises:
   sending a resource adjustment request to a core network to request the core network to adjust a radio resource of the at least one second base station in response to no target base station being determined among the plurality of second base stations.

2. The method of claim 1, wherein the sending the cooperative charging request to the at least one second base station, comprises:
   determining a need of wirelessly charging the terminal in cooperation with the at least one second base station; and
   sending the cooperative charging request to the at least one second base station.

3. The method of claim 1, wherein the cooperative charging request further carries at least one of following information:
   a wireless charging capability of the first base station; or
   a wireless charging capability of the at least one second base station expected by the first base station.

4. The method of claim 1, wherein the cooperative charging configuration comprises at least one of followings:
   a time-division multiplexing pattern, a charging power, a charging duration, or a charging resource.

5. The method of claim 1, wherein the wirelessly charging the terminal in cooperation with the at least one target base station, comprises:
   determining a target base station that is closest to the terminal among a plurality of target base stations, wherein the at least one target base station comprises the plurality of target base stations; and
   wirelessly charging the terminal in cooperation with the target base station that is closest to the terminal.

6. The method of claim 1, further comprising:
   determining at least one adjusted base station whose radio resource is adjusted by the core network from the at least one second base station, based on second response information of the core network for the resource adjustment request; and
   sending the cooperative charging request to the at least one adjusted base station.

7. The method of claim 1, further comprising:
   determining a wireless charging capability of at least one candidate base station; and
   determining the at least one second base station among the at least one candidate base station based on the wireless charging capability.

8. The method of claim 7, wherein determining the wireless charging capability of the at least one candidate base station, comprises at least one of following:
   obtaining the wireless charging capability from the at least one candidate base station;
   obtaining the wireless charging capability from the core network; or
   obtaining the wireless charging capability from the terminal.

9. A method for receiving a request, performed by a second base station, comprising:
   receiving a cooperative charging request from a first base station; and
   determining that the first base station requests the second base station to cooperatively perform wireless charging for a terminal based on the cooperative charging request;
   wherein the method further comprises:
   determining to carry following information based on the cooperative charging request:
     a cooperative charging configuration for wirelessly charging the terminal in cooperation with the second base station expected by the first base station;
   wherein the method further comprises:
   sending response information for the cooperative charging request to the first base station, wherein the response information is configured to indicate whether the second base station supports the cooperative charging configuration; and adjusting a radio resource through a core network receiving a resource adjustment request sent from the first base station, wherein the resource adjustment request is used to request the core network to adjust the radio resource of the second base station.

10. The method of claim 9, further comprising:
determining to further carry at least one of following information based on the cooperative charging request:
a wireless charging capability of the first base station; or
a wireless charging capability of the second base station expected by the first base station.

11. The method of claim 9, wherein the cooperative charging configuration comprises at least one of followings:
a time-division multiplexing pattern, a charging power, a charging duration, or a charging resource.

12. The method of claim 9, further comprising:
wirelessly charging the terminal in cooperation with the first base station based on the cooperative charging configuration, wherein the response information indicates that the second base station supports the cooperative charging configuration.

13. A first base station, comprising:
a processor;
a memory for storing computer programs; wherein
when the computer programs are executed by the processor, the processor is caused to perform:
sending a cooperative charging request to at least one second base station to request the at least one second base station to cooperatively perform wireless charging for a terminal;
wherein the cooperative charging request carries a cooperative charging configuration for wirelessly charging the terminal in cooperation with the at least one second base station expected by the first base station;
wherein the cooperative charging request comprises the cooperative charging configuration, the processor is further caused to perform:

receiving first response information for the cooperative charging request from a plurality of second base stations including the at least one second base station;
determining at least one target base station capable of providing the cooperative charging configuration among the plurality of second base stations; and
wirelessly charging the terminal in cooperation with the at least one target base station;
the processor is further caused to perform:
sending a resource adjustment request to a core network to request the core network to adjust a radio resource of the at least one second base station in response to no target base station being determined among the plurality of second base stations.

14. The first base station of claim 13, wherein the sending the cooperative charging request to the at least one second base station, comprises:
determining a need of wirelessly charging the terminal in cooperation with the at least one second base station; and
sending the cooperative charging request to the at least one second base station.

15. The first base station of claim 13, wherein the cooperative charging request further carries at least one of following information:
a wireless charging capability of the first base station; or
a wireless charging capability of the at least one second base station expected by the first base station.

16. The first base station of claim 13, wherein the processor is further caused to perform:
determining a wireless charging capability of at least one candidate base station; and
determining the at least one second base station among the at least one candidate base station based on the wireless charging capability.

17. A second base station, comprising:
a processor;
a memory for storing computer programs; wherein
when the computer programs are executed by the processor, the processor is caused to perform the method for receiving a request of claim 9.

* * * * *